US011825143B2

(12) United States Patent
Fanfani

(10) Patent No.: US 11,825,143 B2
(45) Date of Patent: Nov. 21, 2023

(54) SYSTEMS AND METHODS FOR PROVIDING PERSONALIZED MEDIA CONTENT TO A USER

(71) Applicant: Discovery.com, LLC, New York, NY (US)

(72) Inventor: Andrea Fanfani, London (GB)

(73) Assignee: DISCOVERY.COM, LLC, New York, NY (US)

( * ) Notice: Subject to any disclaimer, the term of this patent is extended or adjusted under 35 U.S.C. 154(b) by 0 days.

(21) Appl. No.: 17/587,171

(22) Filed: Jan. 28, 2022

(65) Prior Publication Data
US 2023/0247245 A1    Aug. 3, 2023

(51) Int. Cl.
*H04N 21/2668*    (2011.01)
*H04N 21/262*    (2011.01)
*H04N 21/258*    (2011.01)

(52) U.S. Cl.
CPC ... *H04N 21/2668* (2013.01); *H04N 21/25891* (2013.01); *H04N 21/26233* (2013.01)

(58) Field of Classification Search
CPC .......... H04N 21/4147; H04N 21/4312; H04N 21/4314; H04N 21/4333; H04N 21/4345; H04N 21/44008; H04N 21/44224; H04N 21/4532; H04N 21/454; H04N 21/458; H04N 21/4668; H04N 21/47; H04N 21/4751; H04N 21/4755; H04N 21/4826; H04N 5/76; H04N 5/782; H04N 7/163; H04N 21/47214; H04N 21/2625; H04N 21/4583; H04N 21/44213; H04N 21/44218; H04N 21/2668; H04N 21/25891; H04N 21/26233
See application file for complete search history.

(56) References Cited

U.S. PATENT DOCUMENTS

2002/0152463 A1\* 10/2002 Dudkiewicz ....... H04N 21/8543
725/35
2003/0126600 A1\* 7/2003 Heuvelman ........ H04N 21/4333
725/35

(Continued)

OTHER PUBLICATIONS

Https://docs.aws.amazon.com/mediatailor/latest/ug/channel-assembly-getting-started.html, Website, Impact One-Click Ethical Shopper, accessed Jan. 28, 2022 (7 pages).

(Continued)

*Primary Examiner* — Rong Le
(74) *Attorney, Agent, or Firm* — Bookoff McAndrews, PLLC

(57) ABSTRACT

Systems and methods for providing personalized media content by a personalized media content delivery system are disclosed. One method includes identifying a user of an information handling device associated with the personalized media content delivery system utilizing user identification data. A user profile that is associated with the identified user may then be accessed. The user profile may contain one or more content viewing preferences of the user. One or more articles of media content stored in a content database associated with the user's content viewing preferences may be determined. A personalized media stream containing these articles of media content may then be assembled and subsequently provided to the user on a digital channel of an application platform running on the information handling device.

18 Claims, 8 Drawing Sheets

(56) References Cited

U.S. PATENT DOCUMENTS

2007/0094702 A1* 4/2007 Khare ................ H04N 21/4335
  725/89
2016/0309227 A1* 10/2016 Casagrande ....... H04N 21/4583
2018/0192144 A1* 7/2018 McElroy ........... H04M 1/72448
2019/0281347 A1* 9/2019 Casagrande ....... H04N 21/4147

OTHER PUBLICATIONS

Https://www.makeuseof.com/netflix-direct-linear-tv-channel-france/, Website, Netflix Launches a Linear TV Channel in France, accessed Jan. 28, 2022 (5 pages).

* cited by examiner

SYSTEMS AND METHODS FOR PROVIDING PERSONALIZED MEDIA CONTENT TO A USER

TECHNICAL FIELD

The present disclosure relates generally to the field of multimedia streaming and, more particularly, to systems and methods for providing personalized media content to a user on a media streaming application platform.

BACKGROUND

Individuals may access and interact with an array of digital media content on their information handling devices ("devices"), e.g., smart phones, tablet devices, laptops and/or personal computers, smart televisions, and the like. For example, an individual may utilize a video streaming platform on their laptop to watch various types of media such as sporting events, television shows, movies, documentaries, and the like. In some situations, individuals may find it difficult to identify content on these platforms that they would enjoy viewing. The present disclosure is accordingly directed to addressing these and other drawbacks to the existing media content delivery systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In summary, one aspect provides a method of providing personalized media content by a personalized media content delivery system, the method comprising: identifying, utilizing user identification data, a user of an information handling device; accessing, based on the identifying, a user profile associated with the user, wherein the user profile comprises one or more content viewing preferences of the user; determining, using a processor, one or more articles of media content stored in a content database that are associated with the one or more content viewing preferences; assembling, responsive to the determining, a personalized media stream containing the one or more articles of media content; and providing, on a digital channel of an application platform of the information handling device, the personalized media stream to the user.

Another aspect provides an information handling device, including: one or more computer readable media storing instructions for providing personalized media content; and one or more processors configured to execute the instructions to perform operations comprising: identifying, utilizing user identification data, a user of the information handling device; accessing, based on the identifying, a user profile associated with the user, wherein the user profile comprises one or more content viewing preferences of the user; determining, using a processor, one or more articles of media content stored in a content database that are associated with the one or more content viewing preferences; assembling, responsive to the determining, a personalized media stream containing the one or more articles of media content; and providing, on a digital channel of an application platform of the information handling device, the personalized media stream to the user.

A further aspect provides a non-transitory computer-readable medium storing instructions for providing personalized media content, the instructions, when executed by one or more processors, causing the one or more processors to perform operations including: identifying, utilizing user identification data, a user; accessing, based on the identifying, a user profile associated with the user, wherein the user profile comprises one or more content viewing preferences of the user; determining, using a processor, one or more articles of media content stored in a content database that are associated with the one or more content viewing preferences; assembling, responsive to the determining, a personalized media stream containing the one or more articles of media content; and providing, on a digital channel of an application platform of the information handling device, the personalized media stream to the user.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE DRAWINGS

The accompanying drawings, which are incorporated in and constitute a part of this specification, illustrate several embodiments and together with the description, serve to explain the principles of the disclosure.

DETAILED DESCRIPTION OF EMBODIMENTS

Figure 1:
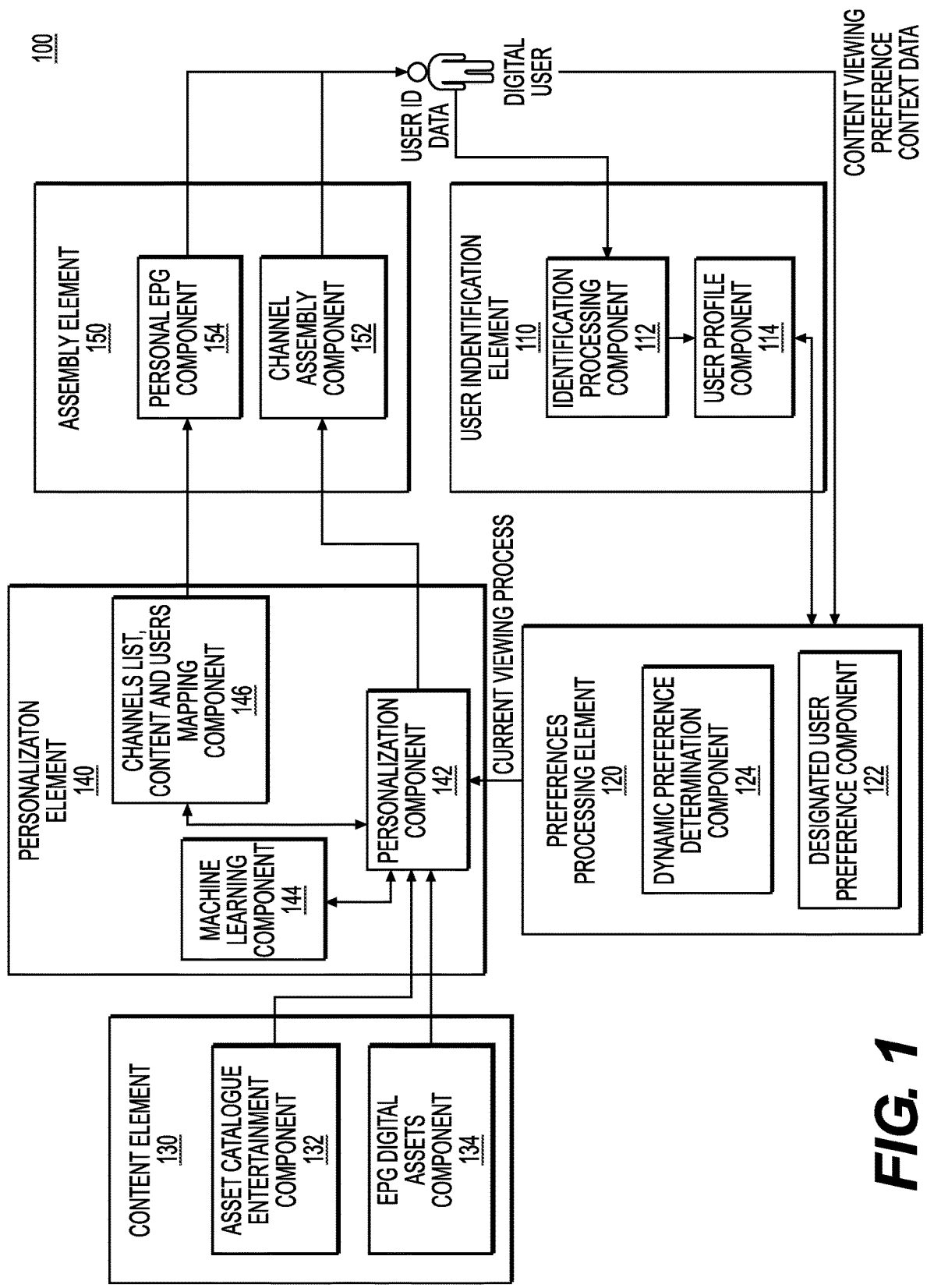
FIG. 1 depicts a block diagram of an exemplary personalized media content delivery system, according to one aspect of the present disclosure.

The following embodiments describe systems and methods for providing personalized media content to a user. More particularly, the embodiments contemplated in the present disclosure may identify a user's viewing preferences and thereafter dynamically provide the user with content that is consistent with those preferences on a personalized digital channel.

As discussed above, existing media delivery services are not optimized to provide curated media content that is customized to and consistent with an individual's viewing preferences. More particularly, individuals have historically consumed visual media by watching television. Based on their viewing preferences, an individual could select from among a variety of different television channels, each of which may be dedicated to broadcasting content of a specific theme (e.g., sports, news, weather, movies, etc.). However, the process of navigating through the various television channels to identify content-of-interest is generally time-consuming and burdensome. Furthermore, even television channels aligned with a user's viewing interests may not always broadcast content that an individual wants to watch (e.g., a user interested in watching tennis-related content may be disappointed to find that none of the sports-related channels are broadcasting media associated with tennis).

Over the past decade, video streaming platforms have become a ubiquitous means for consuming media. These platforms have largely expanded the amount of on-demand content available to a user. However, the sheer volume of available content on these platforms may be overwhelming to certain individuals. Additionally or alternatively, a user unfamiliar with a particular platform interface may find it difficult to navigate through the multitude of content windows to find something that they may enjoy viewing, which may lead to a poor user experience. Additionally still, many of these platforms do not provide users access to live content and those that do face the same issues as described above with respect to conventional television.

To address the above-noted problems, the present disclosure describes a personalized media content delivery (PMCD) system that can provide curated media content to a user that is customized to and consistent with a user's viewing preference. For example, a user identification element, a preferences element, a personalization element, a content element, an assembly element, and all components thereof, of the PMCD system may communicate and work in unison to provide a personalized viewing experience for a user.

In one embodiment, the PMCD system of the present disclosure may identify, via the user identification element, an identity of a user of a device and access a user profile associated therewith. The user profile may be linked to a preferences processing element, which may identify one or more current viewing preferences associated with the user. The indication of these viewing preferences may then be transmitted from the preferences processing element to the personalization element. Further, the personalization element may receive indications of available articles of media data and the taxonomic designations associated therewith from a content element. The personalization element may then identify a dedicated set of programming that is curated for the user based upon a comparison of the user's current viewing preferences to the available articles of media data. The dedicated set of programming may then be transmitted to an assembly element which may construct and deliver a personalized digital channel, along with a personalized digital channel guide, to the user.

It is important to note that although the remainder of this discussion is described with respect to sports-related media content and sub-genres thereof, such a designation is not limiting and is merely for illustrative purposes only. More particularly, the PMCD system as described herein may curate media of virtually any genre and theme for a user based on their identified viewing preferences.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary system 100 including a user identification element 110, a preferences processing element 120, a content element 130, a personalization element 140, and an assembly element 150. Each of the foregoing elements may be resident on a single device (e.g., a user's device, etc.) or, alternatively, some or each of the foregoing elements may be resident on different devices or servers. Each of the foregoing elements may be in communication with some or all of the other elements directly, indirectly, and/or via a network (e.g., the Internet and/or one or more cloud networks).

In one embodiment, the user identification element 110 may be configured to determine an identity of a user of a device compatible with and/or connected to the PMCD system 100. The determination of the user's identity may be facilitated in one or more different ways and may leverage data obtained by one or more different sensors integrally or operatively coupled to the user's device (e.g., microphones, camera sensors, etc.). For instance, in a situation where only a single user is associated with a device, an embodiment may receive (e.g., from available device metadata, etc.) an indication of the user that the device is registered to. In another example, an embodiment may receive user-provided identification input at an application platform of the PMCD system 100 resident on the user's device. Possible types of user-provided identification input may include, but are not limited to, a username/password key pair provided to one or more input fields of a login screen of the application platform (e.g., via touch input, stylus input, keyboard input, remote control input, etc.), a predetermined audible input phrase detected by one or more audio capture devices (e.g., microphones, etc.), a predetermined gesture input detected by one or more camera sensors, and any combination of the foregoing. Additionally or alternatively to the foregoing, in yet another example, an embodiment may attempt to determine a user's identity dynamically (i.e., without receipt of any explicit user identification input). For instance, an embodiment may leverage one or more microphone or camera sensors to capture user characteristic data (e.g., user voice data, user facial feature data, a combination thereof, etc.). These sensors may be configured to be always-on or, alternatively, may activate and initiate characteristic monitoring responsive to detection of a predetermined event (e.g., responsive to detecting that the user device is activated, responsive to detecting that the application platform is initiated, responsive to detecting that the user is in a proximate area to the device, etc.).

In an embodiment, the received user input and/or detected characteristic data may be transmitted to an identification processing component 112 of the user identification element 110. The identification processing component 112 may be configured to determine whether the user input and/or user characteristic data corresponds to an existing user profile 114. For example, in one embodiment, the identification processing component 112 may compare the received user login information against a listing of login credentials stored in an accessible database, wherein each of the login credentials in the listing is associated with a previously established user profile. Responsive to identifying a match between the user login information and a specific profile in the database, an embodiment may grant the user access to their user profile 114. In a similar embodiment, the identification processing component 112 may compare the received user characteristic data against a listing of previously established user characteristics (e.g., established during a training phase of the user profile creation, etc.). Responsive to identifying that a predetermined threshold level of similarity exists between the user characteristic data and the previously established user characteristics (e.g., at least fifty percent similarity, at least seventy-five percent similarity, substantially one-hundred percent similarity, etc.), an embodiment may grant the user access to their user profile 114.

In an embodiment, the user profile 114 may contain an indication of one or more existing content viewing preferences of the user. For example, the user profile 114 may contain an indication of one or more of a user's preferred: genre (e.g., football, soccer, tennis, etc.), sub-genre (e.g., professional football, collegiate football, etc.), programming type (e.g., live sporting events, sports-related news, sports-related documentaries, sports-related fictional movies or series, etc.), event type (e.g., a specific sporting event such as The World Cup or The Olympic Games, etc.), team(s) (e.g., Professional Football Team X, Collegiate Football Team Y, etc.), athlete(s)/player(s), announcer(s) or news anchor(s), and the like. One or more of these preferences may be explicitly designated by the user or, alternatively, may be dynamically determined by the PMCD system 100, as further described herein.

Still referring to FIG. 1, the user profile 114 may be linked to a preferences processing element 120. The preferences processing element 120 may receive and process context data associated with a user to ensure that a user's viewing preferences in the user profile 114 are always up-to-date and to provide the user with a personalized viewing experience, as later described herein. In an embodiment, the preferences processing element 120 may contain two sub-components, i.e., a designated user preference component 122 and a dynamic preference determination component 124. With respect to the former, the designated user preference component 122 may contain a listing of one or more user preferences as outlined in the user profile 114. These preferences may be explicitly designated by the user (e.g., at a menu screen on the application platform, etc.). With respect to the latter, the dynamic user preference component 124 may be configured to dynamically determine (i.e., without receipt of explicit user designation input) one or more viewing preferences based on the received context data.

In an embodiment, context data associated with a user's video consumption behavior may be fed to the dynamic preference determination component 124. Non-limiting types of video consumption behavior include: types of content previously viewed by the user, the frequency at which those types of content were viewed (e.g., daily, weekly, monthly, etc.), whether content is fully viewed (i.e., from beginning to end) or partially viewed, whether certain articles of media content are paused or continued to let run, whether certain articles of media content are switched away from, and the like. Articles of media that are viewed more frequently, fully, and contain inherent indications of user interest (e.g., articles that are paused so that a user does not miss content, etc.) may be considered preferred content whereas articles of media that are infrequently viewed, frequently or occasionally switched away from, and contain inherent indications of user disinterest (e.g., articles that are allowed to play in full even during periods of device inactivity or user absence, etc.) may be considered content that is not appealing to a user.

Additionally or alternatively to the foregoing, in another embodiment, given available user permissions the dynamic preference determination component 124 may additionally receive and process context data obtained by one or more camera and/or audio sensors of a device to deduce user viewing preferences. For example, user viewing preferences may be deduced based upon captured images of sports memorabilia positioned around the user's room or sports logos present on the user's clothing (e.g., by identifying the genre of sports memorialized or advertised, the teams associated with those sports, etc.), sports topics discussed by the user with others in the proximate area, and the like. Additionally or alternatively, in another embodiment, given available user permissions the dynamic preference determination component 124 may additionally receive and process available user communication data to deduce user viewing preferences. More particularly, an embodiment may access and analyze a user's text messages, emails, social media messages, and the like, to obtain an indication of their content viewing preferences. For example, user viewing preferences may be deduced based upon identifying an upcoming sporting match to be attended by the user, a text message chain discussing a particular sport, one or more social media posts highlighting the accomplishment of a specific team or player, etc.

In an embodiment, the preferences processing element 120 may compare and reconcile the explicit preferences made by the user at the designated user preference component 122 with the dynamically determined preferences at the dynamic preference determination component 124. More particularly, one component may contain a user viewing preference that may not be contained by the other (e.g., the designated user preference component 122 may contain an indication that football is a preferred sports category whereas the dynamic preference determination component 124 may contain a dynamic determination that a user especially enjoys watching college football). Additionally or alternatively, discrepancies between the two components may be settled, for instance, by a preconfigured algorithm. For example, an explicit user preference designation may take priority over a conflicting dynamically determined preference. Additionally or alternatively, knowledge from the two components may be utilized to rank each of the user's viewing preferences with respect to one another (e.g., in a hierarchical list of viewing preferences, etc.). For example, given a worldwide event such as The Summer Olympic Games, an embodiment may identify that a particular user enjoys watching both track and field events and swimming events. However, an embodiment may identify that a user especially enjoys watching track and field over swimming because their viewing time for track and field events is longer and more frequent than for swimming events.

Ultimately, in an embodiment, an aggregate viewing preferences list may be constructed by the two preferences components that contains indications of one or more current viewing preferences of a user and, in some embodiments, their rankings with respect to one another. This list may be transmitted back to the user profile 114 to update a listing of existing user preferences. In an embodiment, if no preference-related context data exists or if the preference-related context data does not indicate that any updates should be made, then an embodiment may maintain the existing content viewing preferences of the user in the user profile 114.

Still referring to FIG. 1, a content element 130 is provided that contains a general repository of media content that may be accessible to the PMCD system 100. More particularly, the accessible media content may be embodied in two components, i.e., an asset catalogue entertainment component 132 and an electronic program guide (EPG) digital assets component 134. With respect to the former, the asset catalogue entertainment component 132 may contain video-on-demand (VOD) content from an entertainment archive. Non-limiting examples of available content from the asset catalogue entertainment component 132 may include sports-related movies, sports-related series, sports-related documentaries, other types of sports-related productions, and the like. With respect to the latter, the EPG digital assets component 134 may contain live, replayed, and/or scheduled content on linear and event channels. Non-limiting examples of available content from the EPT digital assets component 134 may include live or rerun sporting events, live or rerun sporting productions (e.g., newscasts, etc.), upcoming sporting events or productions, and the like.

In an embodiment, each article of media content available in the content element 130 may contain an associated taxonomic designation that identifies what the article of media content is. More particularly, the taxonomic designation may not only specify the type of asset an article of media content is (e.g., live match, recorded episode, etc.) but may also identify the genre, sub-genre, type, etc., associated with that media article. This designation may be embodied as a metadata tag that is attached to each article of media content or, additionally or alternatively, may be embodied as an association that is manifest in a list of associations between media articles and their corresponding taxonomy. In an embodiment, the taxonomic designation may be pre-assigned (e.g., by a producer or creator of the media article). Alternatively, in situations where an article of media content does not have a pre-assigned designation, the PMCD system 100 may attempt to assign a taxonomic designation for the article of media content dynamically (e.g., by analyzing any available metadata attached to the article of media content, by performing audio and/or visual analysis on the actual content of the article of media content, etc.).

Still referring to FIG. 1, the current viewing preferences of the user, as determined by the preferences processing element 120, as well as a listing of all available media content with their associated taxonomic designations, as constructed by the content element 130, may be transmitted to a personalization component 142 of a personalization element 140. The personalization element 140 may process the received input from the preferences processing element 120 and the content element 130 to provide a dedicated set of programs to the user that are consistent with their current viewing preferences.

In an embodiment, the personalization component 142, in conjunction with one or more pre-configured algorithms and/or trained artificial intelligence (A.I.) of the machine learning component 144, may identify media content that is most aligned with a user's current viewing preferences. More particularly, the personalization component 142 and the machine learning component 144 may determine whether aspects of the taxonomic designation associated with each article of media content from the content element 130 are consistent with the user's determined viewing preferences. An embodiment may then filter out those media articles that are not aligned with the user's viewing preferences. For example, given a user having a viewing preference for live baseball games, fictional football-related productions (e.g., movies, TV-shows, etc.), and live or rerun daily sporting news broadcasts, an embodiment may dynamically filter out those articles of media content that do not have taxonomic designations associated with those preferences. In an embodiment, the remaining articles of media content after the filtration process may be transmitted to a channels mapping component 146. The channels mapping component 146 may contain a listing of all of the available articles of media content that are aligned with the user's current viewing preferences along with the sources (e.g., existing conventional or digital channels, etc.) from which they are derived.

Still referring to FIG. 1, an assembly element 150 may receive indications of the determined articles of media content aligned with the user's current viewing preferences and may utilize this knowledge to assemble both: a personalized digital channel for the user at a channel assembly component 152 and a channel guide for the current and upcoming programming in the channel at a personal EPG component 154. Both of these constructions may then be presented to the user on a personalized digital channel of the application platform.

In an embodiment, the articles of media content determined to be aligned with the user's current viewing preferences may be transmitted from the personalization component 142 of the personalization element 140 to a channel assembly component 152 of the assembly element 150. The channel assembly component 152 may rely on one or more criteria in the assembly of the personalized digital channel with respect to content order and flow. For instance, in one embodiment, a hierarchical assembly process may be adopted by the channel assembly component 152 in which the media content is presented to the user in a descending order of rank (i.e., all of the most preferred media content is presented to the user first, followed by the second most preferred articles of media content, and so on). In such an organizational structure, an embodiment may ensure that a user is always consuming the available media content that is most aligned with their preferred viewing interests. In another embodiment, live broadcasts may be prioritized over archived and/or accessible on-demand content, ensuring that a user is always apprised of the newest content first.

Additionally or alternatively to the foregoing, an embodiment may make dynamic adjustments to the selection or flow of media based upon one or more various types of user-related contextual data. For example, given available permissions, an embodiment may dynamically identify (e.g., based upon calendar data, etc.) that a user has an upcoming scheduled event in 30 minutes. If a currently scheduled broadcast is projected to take longer than 30 minutes to complete, then an embodiment may provide a notification to the user of this fact and/or may dynamically provide the user with the option to watch another article of media that will substantially conclude within the 30 minute timeframe. Additionally or alternatively, given the same situation, an embodiment may dynamically adjust one or more presentation aspects of the current article of media content to attempt to conclude it before the user's scheduled upcoming event. For example, an embodiment may fast forward through aspects of the media content that the PMCD system 100 determines to be immaterial to viewership (e.g., an embodiment may fast forward through the downtime between volleys in a tennis match, etc.).

In an embodiment, the articles of media content determined to be aligned with the user's current viewing preferences may be transmitted from the channels mapping component 146 of the personalization element 140 to the personal EPG component 154 of the assembly element 150. In an embodiment, the personal EPG component 154 may be able to visualize the list of programs contained within the available articles of media content and may be utilized by the user to receive indications of the upcoming programming on their personalized digital channel. More particularly, in much the same way as a conventional channel guide, a user may scroll through an EPG list of upcoming content on their personal channel that is generated by the personal EPG component 154. In an embodiment, a user may provide editing input to the EPG list to adjust a flow of upcoming programming. For example, a user may specify that they do not wish to view one or more articles of media content in the EPG list at the scheduled time. In such a situation, if possible, an embodiment may attempt to substitute alternative preferred media content into the vacant time slots.

Figure 2:
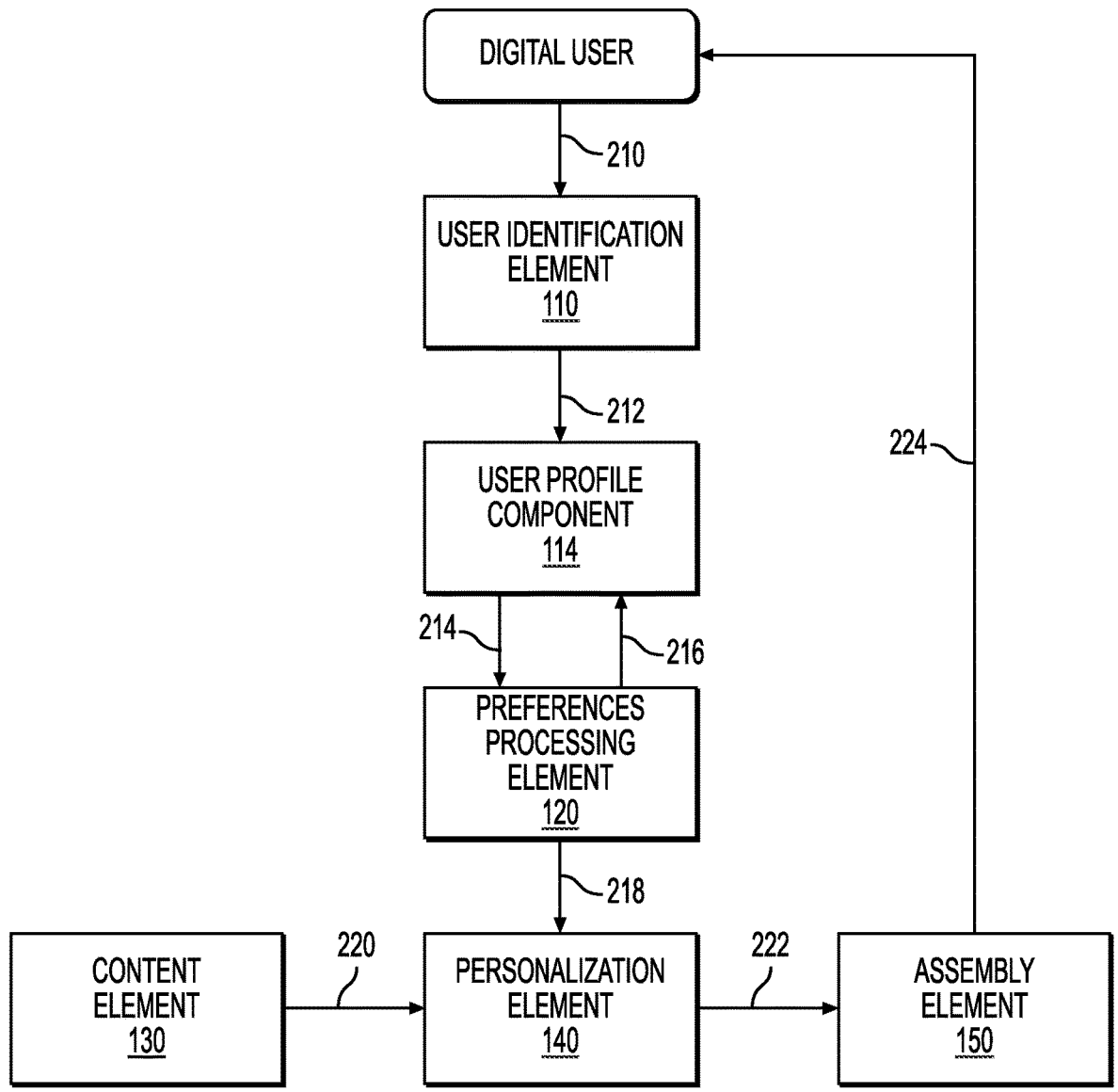
FIG. 2 depicts a block diagram of another exemplary electronic transaction system, according to one aspect of the present disclosure.

FIG. 2 illustrates a flowchart of an exemplary method 200 of providing a digital channel to a user containing personalized media content. Exemplary process flows of the method 200, performed in accordance with the system 100 above, are described hereinafter.

At step 210, the PMCD system 200 may utilize a user identification element 110 to determine an identity of the user. The user identification element 110 may leverage an identification processing component contained therein to verify a login request provided by the digital user and/or to dynamically deduce characteristics associated with the digital user. Responsive to verifying the identity of the digital user, the PMCD system 200 may access, at step 212, a user profile component 114 of an application platform associated with the PMCD system 200. The user profile component 114 may contain, inter alia, a listing of current viewing preferences associated with the user. At step 212, the PMCD system 200 may communicate with a preferences processing element 120 that is linked to the user profile component 114. The preferences processing element 120 may leverage knowledge obtained from two sub-components, i.e., a designated user preference component and a dynamic preference determination component, to derive a list of one or more current user preferences. The preferences processing element 120 may, at step 216, update the user profile component 114 with the mostly recently determined user viewing preferences. Additionally, the preferences processing element 120 may, at step 218, transmit an indication of these determined viewing preferences to a personalization element 140. The personalization element 140 may, at step 220, further receive a listing of available articles of media content, wherein each article of media content is associated with a taxonomic designation. Utilizing a personalization component contained therein, the personalization element 140 may generate for the user a dedicated set of assembled programming that is curated to the user based on their determined viewing preferences. At step 222, the personalization element 140 may communicate the identified articles of media content preferred to be viewed by the user to an assembly element 150. The assembly element 150 may construct a personalized digital channel for the user that may substantially only play content that the user prefers to watch. Additionally, the assembly element 150 may construct a digital channel guide that a user may interact with to identify and/or change the upcoming schedule of media content on the personalized digital channel guide. At step 224, the personalized digital channel along with the digital channel guide may be provided to the user, e.g., on the application platform of their device.

Figure 3:
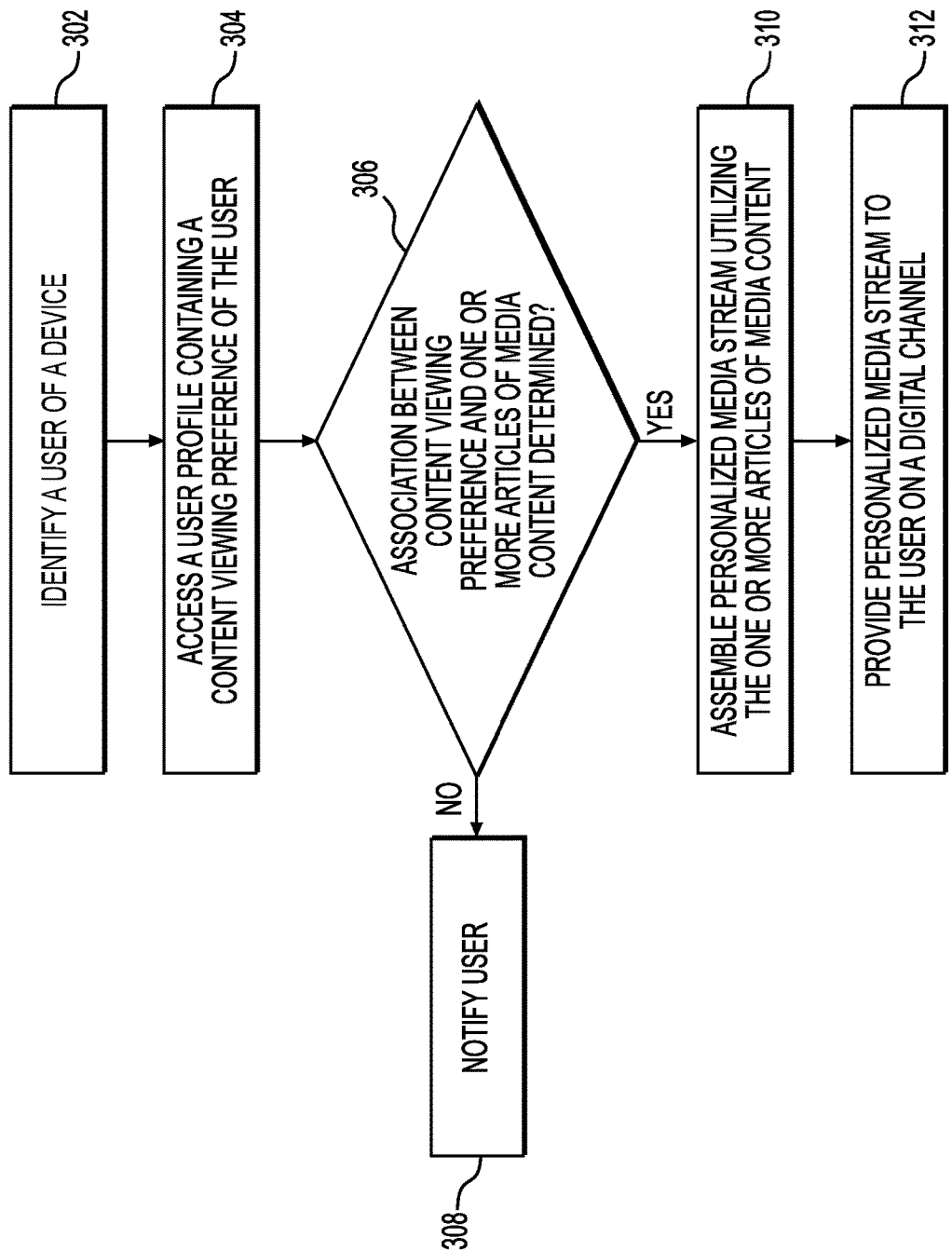
FIG. 3 illustrates a flowchart of an exemplary method of providing personalized media content to a user, according to one aspect of the present disclosure.

FIG. 3 illustrates a flowchart of another exemplary method 300 of providing a digital channel to a user containing personalized media content in accordance with the present disclosure. Exemplary process flows of the method 300, performed in accordance with the systems 100 and 200 above, are described hereinafter.

At step 302, an embodiment may identify a user of a media streaming application platform on a device. The user identification process may be performed at a user identification element 110 of the PMCD system 100. More particularly, an identification processing component 112 of the user identification element 110 may receive either explicit user identification input (e.g., a user-provided password, pass phrase, gesture, etc.) or, alternatively, may receive dynamically determined user characteristic data (e.g., as collected by one or more audio and/or video capture sensors of a user's device, etc.). The explicit user input and/or the user characteristic data may then be compared against one or more stored passcodes or known characteristics (e.g., known facial features, known voice print, etc.) that are associated with an identified user. If a match is identified (e.g., a match above a predetermined threshold level of similarity, etc.) then an embodiment may, at step 304, access a user profile that is associated with the user.

In an embodiment, the user profile may contain one or more viewing preferences of the user. These preferences may identify a preferred genre, sub-genre, programming type, team(s), athlete(s), etc. of sports-related content that the user enjoys viewing. In an embodiment, the viewing preferences of the user may be identified in one or more different ways. More particularly, a preferences processing element 120 having a designated user preference component 122 and a dynamic preference determination component 124 may be linked to the user profile. Explicit user preference designations may be transmitted to the designated user preference component 122 whereas dynamically determined viewing preference data (e.g., dynamically determined from user media consumption behavior, captured images or audio, available communication or social media data, a combination thereof, etc.) may be transmitted to the dynamic preference determination component 124. The preferences processing element 120 may then analyze this aggregated data to identify the current viewing preferences of the user. If the current viewing preferences are different than the existing viewing preferences in the user profile, then the user profile may be automatically updated to reflect this change.

At step 306, an embodiment may determine whether an association exists between the viewing preferences of the user and one or more articles of available media content. The articles of media content may be retrieved from a content element 130 of the PMCD system 100. More particularly, the content element 130 may contain two sub-components therein, i.e., an asset catalogue entertainment component 132 from which video-on-demand (VOD) content may be accessed from an entertainment archive and an electronic program guide (EPG) digital assets component 134 from which live, rerun, or scheduled sporting events and/or productions. In an embodiment, each article of media content available from the content element 130 may be assigned a specific taxonomic designation that specifies one or more characteristics associated with that media article (e.g., genre of the media article, type of programming that the media article is, the teams, athletes, individuals, etc. that are present therein, etc.). It is this taxonomic designation for each media article that is compared, at a personalization component 142 of a personalization element 140, against the current viewing preferences of the user.

Responsive to determining, at step 306, that a match does not exist between any of the articles of available media content and the current viewing preferences of the user, then an embodiment may, at step 308, provide a notification to the user (e.g., an audible and/or visual notification provided to the user device, etc.) informing them of this fact. Conversely, responsive to determining, at step 306, that a match does exist between one or more articles of media content and the current viewing preferences of the user, then an embodiment may, at step 310, assemble a personalized media stream using the associated one or more articles of media content. In an embodiment, the personalized media stream may be assembled at an assembly element 150 of the PMCD system 100. More particularly, a channel assembly component 152 of the PMCD system 100 may organize, based on one or more predetermined criteria (e.g., a hierarchical ranking scheme, a specific media provision policy, etc.), the one or more articles of media content into a curated media stream for the user. Additionally, a personal EPG component 154 may construct an interactive channel guide that may allow the user to browse upcoming articles of media content and/or make edits to the media stream schedule. At step 312, an embodiment may then provide the personalized media stream, along with the interactive channel guide, to the user on a digital channel of the media streaming application platform. The personalized media stream may run on the digital channel substantially continuously (i.e., until a user closes or disengages form the media streaming application platform).

Figure 4:
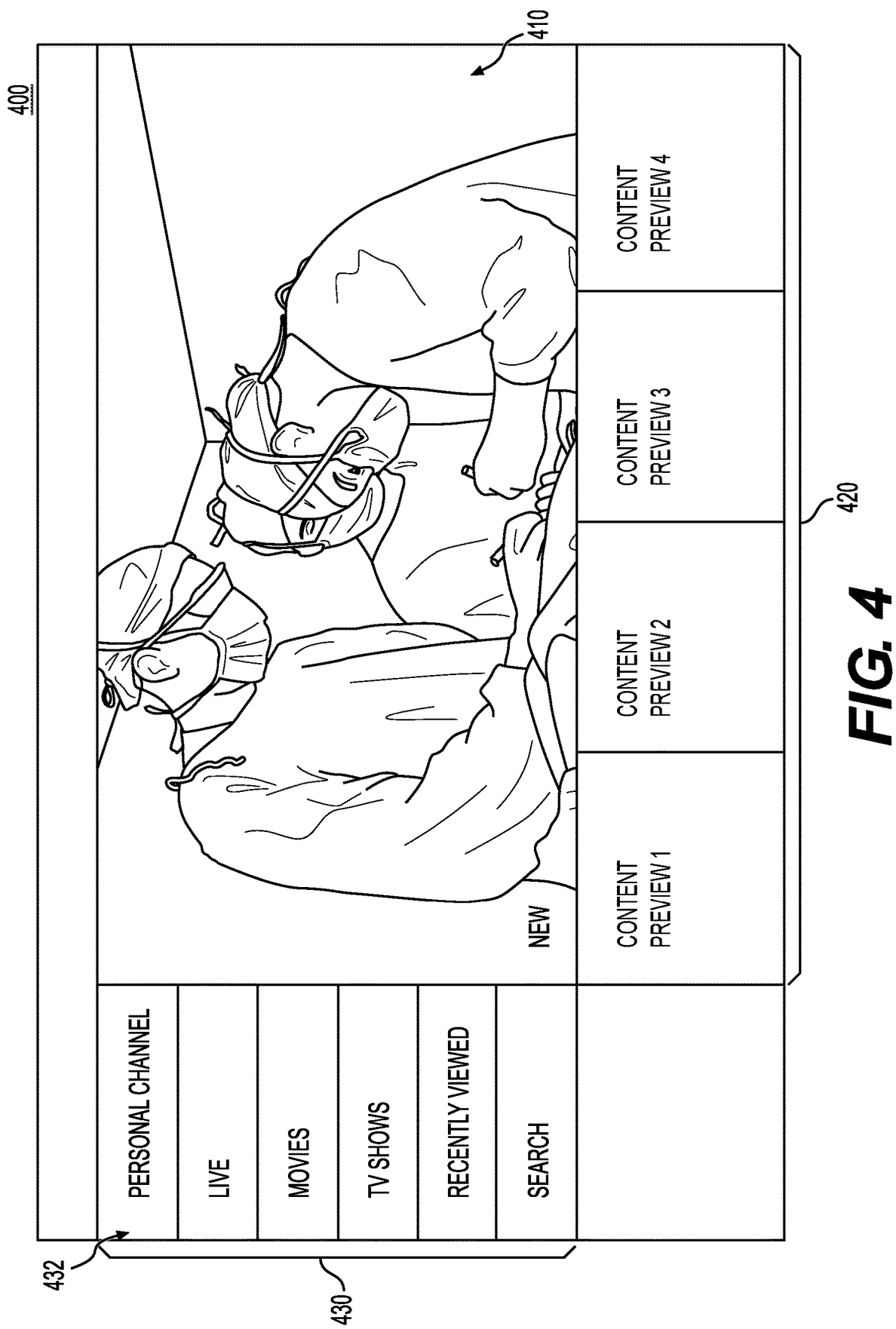
FIG. 4 illustrates a user interface associated with an exemplary personalized media content delivery system according to an embodiment.

FIG. 4 provides a non-limiting example illustration of a user interface 400 for a media streaming platform associated with the PMCD system. The user interface 400 shows a layout of a home screen of the media streaming platform that may include one or more conventional elements. For example, the home screen may contain: a central portion 410 that may display featured content (e.g., new or upcoming highly anticipated releases, premiere sporting events, indications of live content, etc.), previews of other available content (e.g., recently viewed content, suggested content, etc.), and a plurality of navigation buttons 430. Among the plurality of navigation buttons 430, a Personal Channel button 432 may exist that may, after user selection, provide a user with a curated stream of media content aligned with their viewing preferences, as previously described herein.

Figure 5:
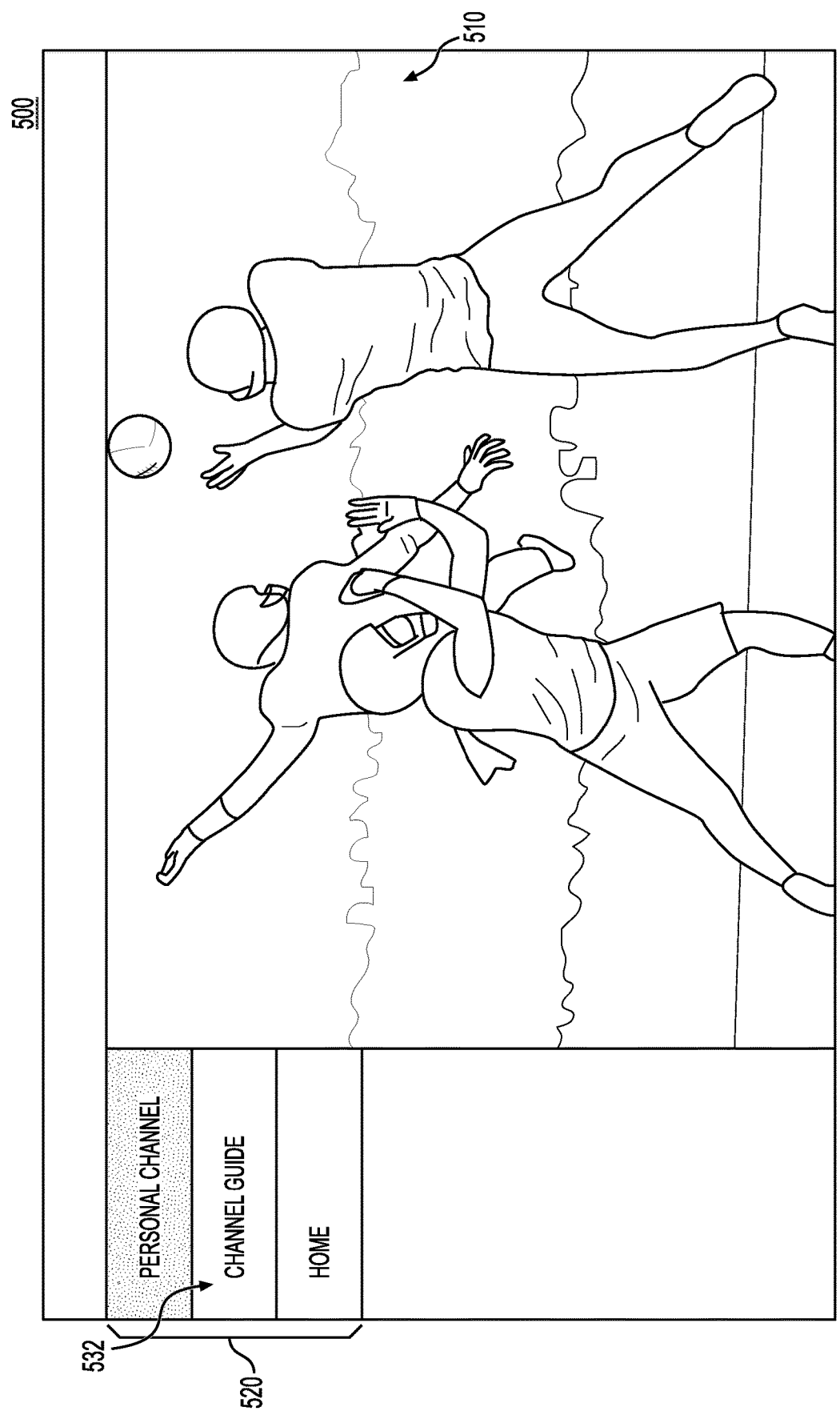
FIG. 5 illustrates a user interface associated with an exemplary personalized media content delivery system according to an embodiment.

FIG. 5 provides another non-limiting example illustration of a user interface 500 for a media streaming platform associated with the PMCD system. The user interface 500 presents a sample view of a content stream on the user's personalized digital channel. More particularly, after a user has selected the Personal Channel button 432 in FIG. 4, the curated stream of media content may be presented to the user at the central portion 510. As previously described, the curated stream of media content may include available on-demand content, live television, or combinations thereof. Within the user interface 500, another menu of navigation buttons 520 may exist, including a selectable Channel Guide button 522. A user may select the Channel Guide button 522 to receive indications of upcoming content on their personalized digital channel.

Figure 6:
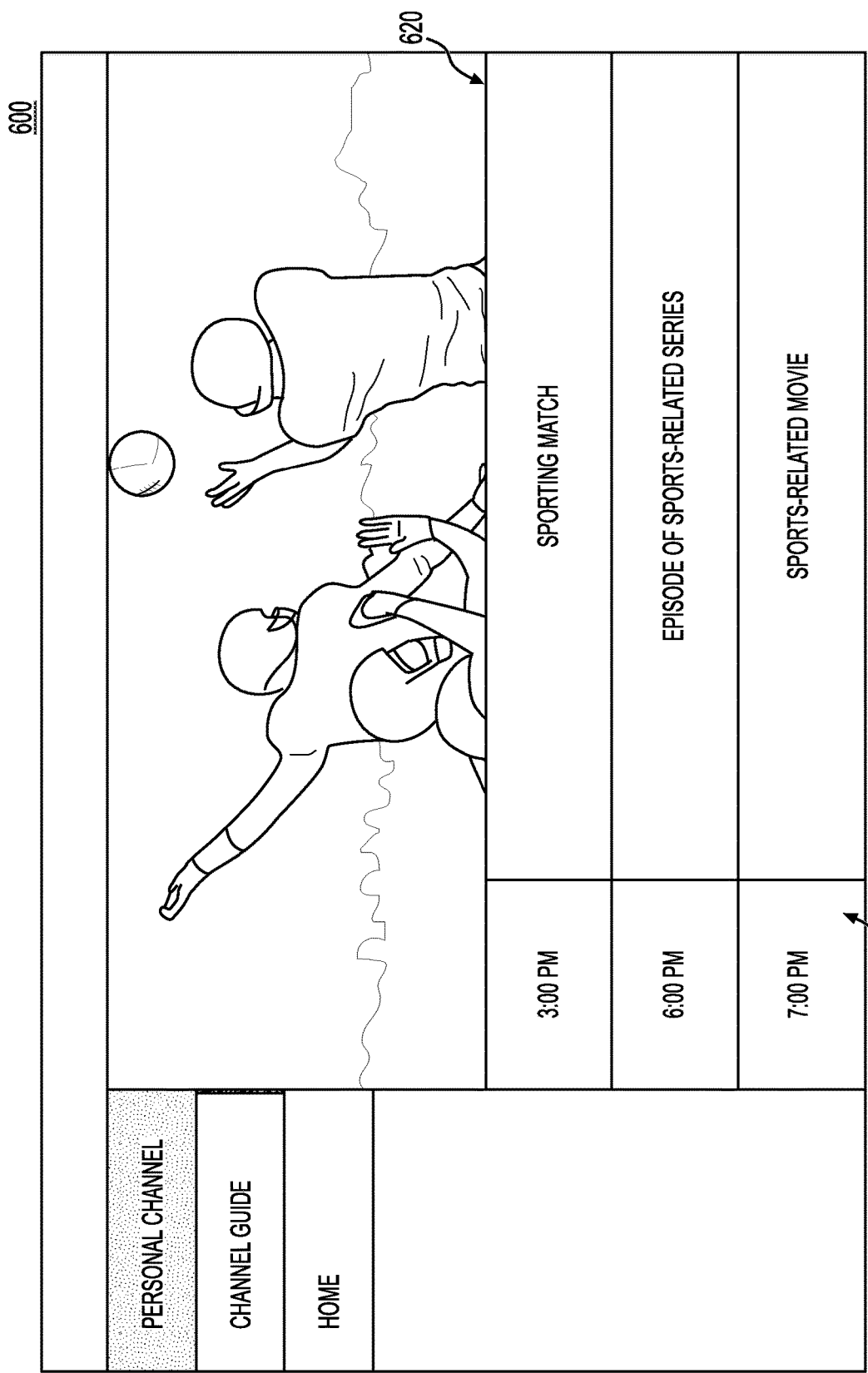
FIG. 6 illustrates a user interface associated with an exemplary personalized media content delivery system according to an embodiment.

FIG. 6 provides another non-limiting example illustration of a user interface 600 for a media streaming platform associated with the PMCD system. The user interface 600 features a reduced central portion 610 along with a channel guide 620 that may appear after a user has selected the Channel Guide button 522 in FIG. 5. The reduced central portion 610 may continue to display the curated media stream whereas the expanded channel guide 620 may provide an indication of upcoming content on the user's digital channel. The channel guide 620 may be editable by the user in that a user may make changes to upcoming content. For example, suppose a user is not interested in watching the 7:00 PM feature 622, they can opt to remove that article of media content from an upcoming list, at which point it may be replaced with either a specific user selection or, alternatively, with another dynamically determined article of media content associated with the user's viewing interests.

Figure 7:
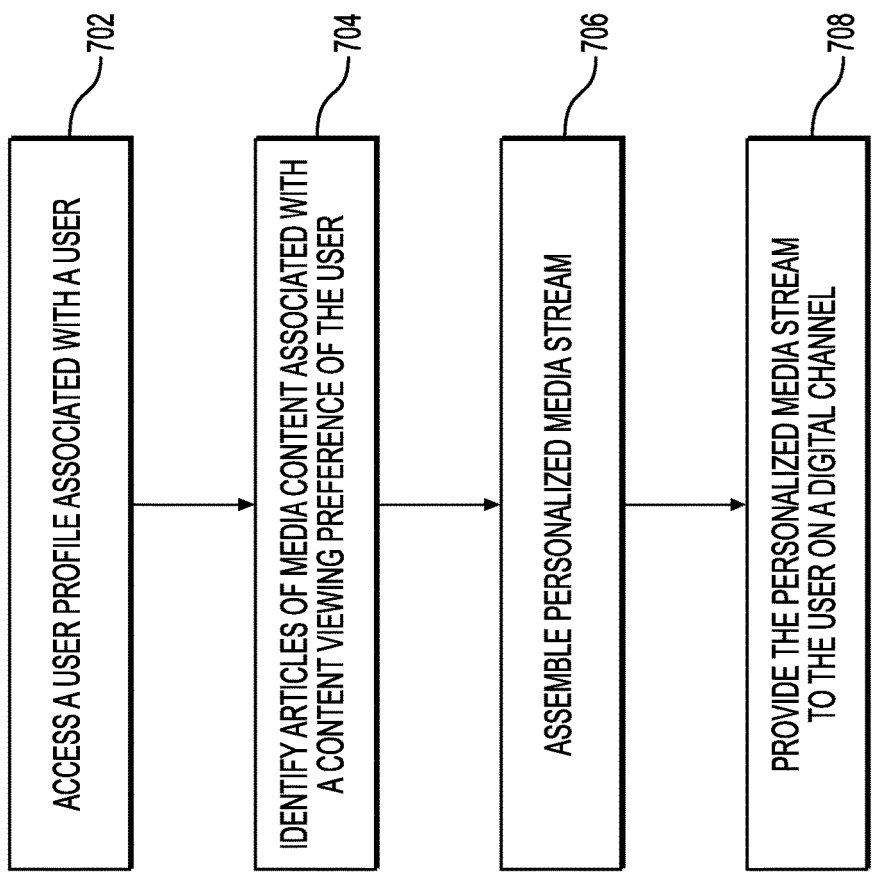
FIG. 7 illustrates a flowchart of another exemplary method of providing personalized media content to a user, according to one aspect of the present disclosure.

FIG. 7 illustrates a flowchart of another exemplary method 700 of providing a digital channel to a user containing personalized media content in accordance with the present disclosure. Exemplary process flows of the method 700, performed in accordance with the systems 100 and 200 above, are described hereinafter.

At step 702, an embodiment may access a user profile linked to a media streaming application platform. The user profile may contain, inter alia, one or more content viewing preferences of a user. These preferences may be explicitly designated by the user or may be dynamically determined by a PMCD system 100. At step 704, an embodiment may identify one or more articles of media content that are associated with the user's most current content viewing preferences. More particularly, a taxonomic designation associated with each article or media content may be compared against the user's content viewing preferences to determine if a match exists. At step 706, those articles of media content determined to be associated with the user's current viewing preferences may be utilized in the assembly of a personalized media stream. At step 708, an embodiment may thereafter provide the personalized media stream to the user on a digital channel. The media stream may play substantially continuously and may present the relevant articles of media content to the user in a predetermined order.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

Figure 8:
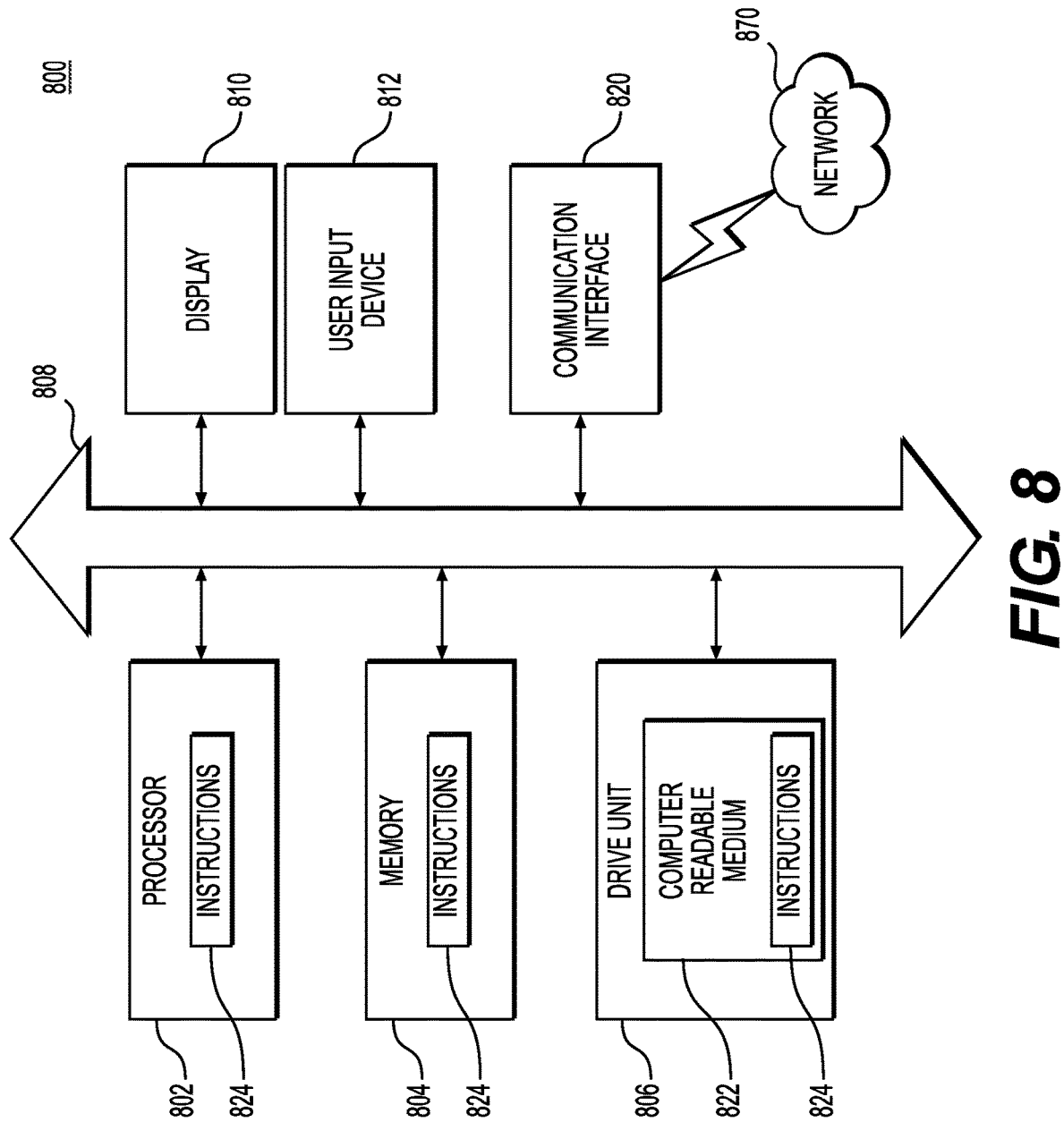
FIG. 8 illustrates a computer system for executing the techniques described herein.

FIG. 8 illustrates a computer system designated 800. The computer system 800 can include a set of instructions that can be executed to cause the computer system 800 to perform any one or more of the methods or computer based functions disclosed herein. The computer system 800 may operate as a standalone device or may be connected, e.g., using a network, to other computer systems or peripheral devices.

In a networked deployment, the computer system 800 may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 800 can be implemented using electronic devices that provide voice, video, or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that can communicate via a bus 808. The memory 804 may be a main memory, a static memory, or a dynamic memory. The memory 804 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 804 includes a cache or random-access memory for the processor 802. In alternative implementations, the memory 804 is separate from the processor 802, such as a cache memory of a processor, the system memory, or other memory. The memory 804 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 804 is operable to store instructions executable by the processor 802. The functions, acts or tasks illustrated in the figures or described herein may be performed by the programmed processor 802 executing the instructions stored in the memory 804. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel payment and the like.

As shown, the computer system 800 may further include a display unit 810, such as a liquid crystal display (LCD), an organic light emitting diode (OLED), a flat panel display, a solid-state display, a cathode ray tube (CRT), a projector, a printer or other now known or later developed display device for outputting determined information. The display 810 may act as an interface for the user to see the functioning of the processor 802, or specifically as an interface with the software stored in the memory 804 or in the drive unit 806.

Additionally or alternatively, the computer system 800 may include an input device 812 configured to allow a user to interact with any of the components of system 800. The input device 812 may be a number pad, a keyboard, or a cursor control device, such as a mouse, or a joystick, touch screen display, remote control, or any other device operative to interact with the computer system 800.

The computer system 800 may also or alternatively include a disk or optical drive unit 806. The disk drive unit 806 may include a computer-readable medium 822 in which one or more sets of instructions 824, e.g., software, can be embedded. Further, the instructions 824 may embody one or more of the methods or logic as described herein. The instructions 824 may reside completely or partially within the memory 804 and/or within the processor 802 during execution by the computer system 800. The memory 804 and the processor 802 also may include computer-readable media as discussed above.

In some systems, a computer-readable medium 822 includes instructions 824 or receives and executes instructions 824 responsive to a propagated signal so that a device connected to a network 870 can communicate voice, video, audio, images, or any other data over the network 870. Further, the instructions 824 may be transmitted or received over the network 870 via a communication port or interface 820, and/or using a bus 808. The communication port or interface 820 may be a part of the processor 802 or may be a separate component. The communication port 820 may be created in software or may be a physical connection in hardware. The communication port 820 may be configured to connect with a network 870, external media, the display 810, or any other components in system 800, or combinations thereof. The connection with the network 870 may be a physical connection, such as a wired Ethernet connection or may be established wirelessly as discussed below. Likewise, the additional connections with other components of the system 800 may be physical connections or may be established wirelessly. The network 870 may alternatively be directly connected to the bus 808.

While the computer-readable medium 822 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 822 may be non-transitory, and may be tangible. Specifically, in the context of this document, the computer readable medium is not a signal and "non-transitory" may include all media except signal media.

The computer-readable medium 822 can include a solid-state memory such as a memory card or other package that houses one or more non-volatile read-only memories. The computer-readable medium 822 can be a random-access memory or other volatile re-writable memory. Additionally or alternatively, the computer-readable medium 822 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 800 may be connected to one or more networks 870. The network 870 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 870 may include wide area networks (WAN), such as the Internet, local area networks (LAN), campus area networks, metropolitan area networks, a direct connection such as through a Universal Serial Bus (USB) port, or any other networks that may allow for data communication. The network 870 may be configured to couple one computing device to another computing device to enable communication of data between the devices. The network 870 may generally be enabled to employ any form of machine-readable media for communicating information from one device to another. The network 870 may include communication methods by which information may travel between computing devices. The network 870 may be divided into sub-networks. The sub-networks may allow access to all of the other components connected thereto or the sub-networks may restrict access between the components. The network 870 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A method of providing personalized media content by a personalized media content delivery system, the method comprising:

identifying, utilizing user identification data, a user of an information handling device;

accessing, based on the identifying, a user profile associated with the user, wherein the user profile comprises one or more content viewing preferences of the user;

determining, using a processor, one or more articles of media content stored in a content database that are associated with the one or more content viewing preferences;

assembling, responsive to the determining, a personalized media stream containing the one or more articles of media content;

providing, on a digital channel of an application platform of the information handling device, the personalized media stream to the user;

detecting, by referencing a calendar that contains events the user is scheduled to engage in, a conflict between a runtime length of a current media article in the personalized media stream and a start time of one of the events in the calendar, wherein each of the events in the calendar corresponds to a real-world activity; and implementing, based on the detecting, an adjustment to presentation of the one or more aspects in the current media article in the personalized media stream so that the current media article concludes before the start time of the scheduled event, wherein the adjustment corresponds to fast forwarding through one or more scenes of the current media article.

2. The method of claim 1, wherein the identifying the user comprises automatically identifying the user utilizing user identity data obtained by one or more sensors associated with the information handling device.

3. The method of claim 1, wherein the one or more content viewing preferences are ascertained via:

receiving, from at least one source, context data associated with the identified user; and identifying, via analysis of the context data, the one or more content viewing preferences.

4. The method of claim 3, wherein the context data is at least one user-related data metric selected from the group of media consumption data, user designation data, image data, audio data, communication data, and combinations thereof.

5. The method of claim 1, wherein the one or more articles of media content correspond to sports-related content and wherein the sports-related content is at least one content type selected from the group of previously recorded sporting events, live sporting events, a fictional sports-related production, a non-fictional sports-related production, and combinations thereof.

6. The method of claim 1, wherein the determining comprises:

identifying a taxonomic designation associated with each media article in the content database;

comparing the taxonomic designation for each media article against the one or more content viewing preferences of the user; and identifying the one or more articles of media content as those having the taxonomic designation consistent with the one or more content viewing preferences.

7. The method of claim 1, wherein the assembling the personalized media stream comprises assembling the personalized media stream in a defined order based upon predetermined criteria.

8. The method of claim 7, wherein the predetermined criteria corresponds to a ranking associated with each of the one or more articles of media content and wherein the assembling comprises prioritizing, from the one or more articles of media content, higher ranked articles of media content over lower ranked articles of media content.

9. The method of claim 7, wherein the providing comprises providing, on the application platform, an interactive channel guide for the digital channel, wherein the interactive channel guide presents a visual representation of the defined order of the personalized media stream.

10. An information handling device, comprising:
one or more computer readable media storing instructions for providing personalized media content; and
one or more processors configured to execute the instructions to perform operations comprising:
identifying, utilizing user identification data, a user of the information handling device;
accessing, based on the identifying, a user profile associated with the user, wherein the user profile comprises one or more content viewing preferences of the user;
determining, using a processor, one or more articles of media content stored in a content database that are associated with the one or more content viewing preferences;
assembling, responsive to the determining, a personalized media stream containing the one or more articles of media content;
providing, on a digital channel of an application platform of the information handling device, the personalized media stream to the user;
detecting, by referencing a calendar that contains events the user is scheduled to engage in, a conflict between a runtime length of a current media article in the personalized media stream and a start time of one of the events in the calendar, wherein each of the events in the calendar corresponds to a real-world activity; and
implementing, based on the detecting, an adjustment to presentation of the one or more aspects in the current media article in the personalized media stream so that the current media article concludes before the start time of the scheduled event, wherein the adjustment corresponds to fast forwarding through one or more scenes of the current media article.

11. The information handling device of claim 10, wherein the operations to identify the user further comprise:
automatically identifying the user utilizing user identity data obtained by one or more sensors associated with the information handling device.

12. The information handling device of claim 10, wherein the one or more content viewing preferences are ascertained via:
receiving, from at least one source, context data associated with the identified user; and
identifying, via analysis of the context data, the one or more content viewing preferences.

13. The information handling device of claim 12, wherein the context data is at least one user-related data metric selected from the group of media consumption data, user designation data, image data, audio data, communication data, and combinations thereof.

14. The information handling device of claim 10, wherein the operations to determine further comprise:
identifying a taxonomic designation associated with each media article in the content database;
comparing the taxonomic designation for each media article against the one or more content viewing preferences of the user; and
identifying the one or more articles of media content as those having the taxonomic designation consistent with the one or more content viewing preferences.

15. The information handling device of claim 10, wherein the operations to assemble the personalized media stream further comprise:
assembling the personalized media stream in a defined order based upon predetermined criteria.

16. The information handling device of claim 15, wherein the predetermined criteria corresponds to a ranking associated with each of the one or more articles of media content and wherein the operations to assemble the personalized media stream further comprise:
prioritizing, from the one or more articles of media content, higher ranked articles of media content over lower ranked articles of media content.

17. The information handling device of claim 10, wherein the operations to provide further comprise:
providing, on the application platform, an interactive channel guide for the digital channel, wherein the interactive channel guide presents a visual representation of a defined order of the personalized media stream.

18. A non-transitory computer-readable medium storing instructions for providing personalized media content, the instructions, when executed by one or more processors, causing the one or more processors to perform operations comprising:
identifying, utilizing user identification data, a user;
accessing, based on the identifying, a user profile associated with the user, wherein the user profile comprises one or more content viewing preferences of the user;
determining, using a processor, one or more articles of media content stored in a content database that are associated with the one or more content viewing preferences;
assembling, responsive to the determining, a personalized media stream containing the one or more articles of media content;
providing, on a digital channel of an application platform of an information handling device, the personalized media stream to the user;
detecting, by referencing a calendar that contains events the user is scheduled to engage, a conflict between a runtime length of a current media article in the personalized media stream and a start time of one of the events in the calendar, wherein each of the events in the calendar corresponds to a real-world activity; and
implementing, based on the detecting, an adjustment to presentation of the one or more aspects in the current media article in the personalized media stream so that the current media article concludes before the start time of the scheduled event, wherein the adjustment corresponds to fast forwarding through one or more scenes of the current media article.

* * * * *